(12) United States Patent  (10) Patent No.: US 11,807,204 B2
Park  (45) Date of Patent: Nov. 7, 2023

(54) FORWARD COLLISION AVOIDANCE SYSTEM AND METHOD OF VEHICLE

(71) Applicant: HYUNDAI MOBIS CO., LTD., Seoul (KR)

(72) Inventor: Seung Jin Park, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 218 days.

(21) Appl. No.: 17/332,466

(22) Filed: May 27, 2021

(65) Prior Publication Data

US 2021/0370890 A1 Dec. 2, 2021

(30) Foreign Application Priority Data

Jun. 2, 2020 (KR) .................. 10-2020-0066726

(51) Int. Cl.
*B60T 7/12* (2006.01)

(52) U.S. Cl.
CPC ............. *B60T 7/12* (2013.01); *B60T 2210/20* (2013.01); *B60T 2210/32* (2013.01); *B60T 2250/04* (2013.01)

(58) Field of Classification Search
CPC ........ B60T 7/12; B60T 7/22; B60T 2201/022; B60T 2210/20; B60T 2210/32; B60T 2250/04; G01S 13/931; G01S 2013/93185; G01S 2013/932; G01S 2013/9322; G01S 2013/9323; B60W 30/08; B60W 10/18; B60W 40/076; B60W 40/11; B60W 2520/16; B60W 2552/15; B60R 21/0134; B60Y 2300/08; B60Y 2400/301; B60Y 2400/303

USPC .......................................................... 701/70
See application file for complete search history.

(56) References Cited

U.S. PATENT DOCUMENTS 9,896,095 B2 * 2/2018 Katoh ............... B60W 30/0956
11,341,847 B1 * 5/2022 Beaurepaire ......... G08G 1/0133
2004/0225424 A1 * 11/2004 Yamamura .......... B60W 50/087
701/1

(Continued)

FOREIGN PATENT DOCUMENTS

AU 2008219810 A1 * 9/2009 ................ B60T 7/12
CN 106853829 A 6/2017

(Continued)

OTHER PUBLICATIONS

Office Action dated May 27, 2023 for counterpart Chinese Patent Application No. 202110616627.X (see English translation).

*Primary Examiner* — Atul Trivedi
(74) *Attorney, Agent, or Firm* — MORGAN, LEWIS & BOCKIUS LLP (57) ABSTRACT

A forward collision avoidance system of a vehicle includes a detector configured to detect an obstacle positioned ahead in a traveling direction of the vehicle; a processor; a memory coupled to the processor and storing an algorithm that, when executed by the processor, causes the processor to: estimate a gradient of a road on which the vehicle is traveling, and determine a braking strategy of the vehicle based on the estimated gradient, a position of the detected obstacle and a velocity of the vehicle; and a controller configured to control braking of the vehicle based on the braking strategy of the vehicle determined by the processor.

16 Claims, 3 Drawing Sheets

(56) References Cited

U.S. PATENT DOCUMENTS

| | | | | |
|---|---|---|---|---|
| 2007/0288133 A1* | 12/2007 | Nishira | ............ | B60W 30/0956 |
| | | | | 701/23 |
| 2008/0015778 A1* | 1/2008 | Matsuura | ............... | G08G 1/166 |
| | | | | 701/301 |
| 2008/0074246 A1* | 3/2008 | Isaji | ............... | B60W 30/18145 |
| | | | | 701/301 |
| 2009/0192710 A1* | 7/2009 | Eidehall | ............ | B60W 50/0097 |
| | | | | 701/300 |
| 2015/0210312 A1* | 7/2015 | Stein | ............ | B62D 6/00 |
| | | | | 701/41 |
| 2015/0291138 A1* | 10/2015 | Joyce | ............ | B60T 8/4872 |
| | | | | 701/74 |
| 2016/0240084 A1* | 8/2016 | Takeuchi | ............ | B60T 7/22 |
| 2017/0210381 A1* | 7/2017 | Nishimura | ............ | B60W 30/09 |
| 2019/0283585 A1* | 9/2019 | Koebler | ............ | B60L 15/2045 |
| 2019/0283586 A1* | 9/2019 | Koebler | ............ | B60L 7/12 |
| 2019/0283587 A1* | 9/2019 | Koebler | ............ | B60L 15/2045 |
| 2019/0283588 A1* | 9/2019 | Koebler | ............ | B60T 7/22 |
| 2019/0283589 A1* | 9/2019 | Koebler | ............ | G08G 1/0112 |
| 2019/0283591 A1* | 9/2019 | Koebler | ............ | B60W 10/08 |
| 2019/0283592 A1* | 9/2019 | Koebler | ............ | B60W 20/12 |
| 2019/0283593 A1* | 9/2019 | Koebler | ............ | B60T 1/10 |
| 2019/0283594 A1* | 9/2019 | Koebler | ............ | B60K 35/00 |
| 2019/0283595 A1* | 9/2019 | Koebler | ............ | B60L 58/16 |
| 2019/0283597 A1* | 9/2019 | Koebler | ............ | B60L 3/12 |
| 2019/0283598 A1* | 9/2019 | Koebler | ............ | B60T 7/18 |
| 2019/0283599 A1* | 9/2019 | Koebler | ............ | B60W 30/18127 |
| 2019/0283600 A1* | 9/2019 | Koebler | ............ | G01C 21/3617 |
| 2019/0283601 A1* | 9/2019 | Koebler | ............ | B60T 7/18 |
| 2019/0283603 A1* | 9/2019 | Koebler | ............ | B60T 7/22 |
| 2019/0283604 A1* | 9/2019 | Koebler | ............ | B60W 30/143 |
| 2019/0283605 A1* | 9/2019 | Koebler | ............ | B60W 50/0097 |
| 2019/0283606 A1* | 9/2019 | Koebler | ............ | B60W 50/0097 |
| 2019/0322174 A1* | 10/2019 | Koebler | ............ | B60L 7/12 |
| 2020/0074863 A1* | 3/2020 | Jung | ............ | G01S 13/867 |
| 2020/0180578 A1* | 6/2020 | Watanabe | ............ | B60T 8/245 |
| 2021/0009112 A1* | 1/2021 | Alzaydi | ............ | B60T 7/22 |
| 2021/0370890 A1* | 12/2021 | Park | ............ | B60T 7/12 |
| 2022/0289198 A1* | 9/2022 | Schmitt | ............ | B60W 50/10 |

FOREIGN PATENT DOCUMENTS

| | | | | |
|---|---|---|---|---|
| CN | 108263279 A | * | 7/2018 | ............ B60Q 1/44 |
| EP | 1470977 A1 | | 10/2004 | |
| JP | 2005186936 A | * | 7/2005 | ............ B60T 7/12 |
| JP | 2007230327 A | * | 9/2007 | |
| JP | 2007253746 A | * | 10/2007 | |
| JP | 2015-134584 A | | 7/2015 | |
| KR | 10-2016-0033513 A | | 3/2016 | |
| KR | 10-2016-0056561 A | | 5/2016 | |
| WO | WO-2009053371 A1 | * | 4/2009 | ............ G08G 1/162 |
| WO | WO-2009103692 A1 | * | 8/2009 | ............ B60R 21/0134 |
| WO | WO-2015136958 A1 | * | 9/2015 | ............ B60T 7/042 |
| WO | WO-2015178839 A1 | * | 11/2015 | ............ B60K 31/00 |
| WO | WO-2016103459 A1 | * | 6/2016 | ............ B60C 19/00 |
| WO | 2017/065158 A1 | | 4/2017 | |
| WO | WO-2019082947 A1 | * | 5/2019 | ............ B60T 13/00 |
| WO | WO-2021106896 A1 | * | 6/2021 | |

\* cited by examiner

FIG. 5

FORWARD COLLISION AVOIDANCE SYSTEM AND METHOD OF VEHICLE

CROSS REFERENCE TO RELATED APPLICATION

The present application claims priority to Korean Patent Application No. 10-2020-0066726, filed Jun. 2, 2020, the entire contents of which is incorporated herein for all purposes by this reference.

BACKGROUND

Technical Field

The present disclosure relates to a system and a method for forward collision avoidance of a vehicle, and more specifically, to emergency braking controls in consideration of a slope of a road the vehicle is traveling.

Description of the Related Art

A forward collision avoidance system of a vehicle is a device that recognizes a vehicle in front using a detection sensor, warns a driver when a collision with the vehicle in front is expected, and avoids the collision or mitigates damage by automatically applying a brake and is also referred to as an autonomous emergency brake (AEB).

Specifically, the forward collision avoidance system calculates the time to collision (TTC) with the vehicle or target in front and controls an autonomous emergency braking (AEB) in accordance with the calculated time to collision.

However, the front collision avoidance system of the related art is tuned for an even road and does not consider a phenomenon that the braking performance changes on a sloped road.

In particular, when emergency braking is applied based on braking performance tuned for an even road, there is a problem that a risk of collision arises on a downward-sloped road.

The matters described above as the technical background are intended only for better understanding of the background of the present disclosure and should not be taken as an acknowledgment that they correspond to the conventional art already known to those with common knowledge in the related art.

SUMMARY

The present disclosure is proposed to solve these problems and aims to provide a system and a method for forward collision avoidance that controls the braking of a vehicle by reflecting a gradient of a road the vehicle is traveling.

In order to achieve the object described above, the forward collision avoidance system of a vehicle according to the present disclosure includes a detector configured to detect an obstacle positioned ahead in a traveling direction of the vehicle; a processor; a memory coupled to the processor and storing an algorithm that, when executed by the processor, causes the processor to: estimate a gradient of a road on which the vehicle is traveling, and determine a braking strategy of the vehicle based on the estimated gradient, a position of the detected obstacle, and a velocity of the vehicle; and a controller configured to control braking of the vehicle based on the braking strategy of the vehicle determined by the processor.

The detector may be a detection sensor detecting a relative position and a relative velocity of the obstacle with respect to the vehicle.

The processor may estimate the gradient of the road by sensing a rotation angle at which the vehicle rotates in a pitch direction.

The processor may estimate the gradient of the road based on navigation information or a sensed atmospheric pressure change.

The processor may estimate the gradient of the road using acceleration or deceleration traveling data of the vehicle.

The processor may calculate a time to collision with the obstacle using the position of the obstacle detected by the detector and the velocity of the vehicle and determine the braking strategy of the vehicle based on the calculated time to collision and the estimated gradient.

The processor may calculate a required deceleration rate based on the calculated time to collision, calculate a slope deceleration rate in accordance with the estimated gradient, and determine the braking strategy of the vehicle such that the calculated slope deceleration rate is reflected in the calculated required deceleration rate.

The processor may calculate a required braking instant based on the calculated time to collision, calculate a slope braking time in accordance with the estimated gradient, and determine the braking strategy of the vehicle such that the calculated slope braking time is reflected in the calculated required braking instant.

In order to achieve the object described above, a forward collision avoidance method of a vehicle according to the present disclosure includes steps of: estimating a gradient of a road on which the vehicle is traveling; detecting an obstacle positioned ahead in a traveling direction of the vehicle; determining a braking strategy of the vehicle based on the estimated gradient, a detected position of the obstacle, and a velocity of the vehicle; and controlling braking of the vehicle based on the determined braking strategy of the vehicle.

In the step of detecting an obstacle, a relative position and a relative velocity of the obstacle with respect to the vehicle may be detected through a detection sensor.

In the step of estimating a gradient of a road, the gradient of the road may be estimated by sensing a rotation angle at which the vehicle rotates in a pitch direction.

In the step of estimating the gradient of the road, the gradient of the road may be estimated based on the navigation information or the sensed atmospheric pressure change.

In the step of estimating the gradient of the road, the gradient of the road may be estimated using acceleration or deceleration traveling data of the vehicle.

In the step of determining the braking strategy of the vehicle, a time to collision with the obstacle may be calculated using the detected position of the obstacle and the velocity of the vehicle and the braking strategy of the vehicle may be determined based on the calculated time to collision and the estimated gradient.

In the step of determining the braking strategy of the vehicle, the required deceleration rate may be calculated based on the calculated time to collision, the slope deceleration rate in accordance with the estimated gradient may be calculated, and the braking strategy of the vehicle may be determined such that the calculated slope deceleration rate is reflected in the calculated required deceleration rate.

In the step of determining the braking strategy of the vehicle, the required braking instant may be calculated based on the calculated time to collision, a slope braking time in accordance with the estimated gradient may be calculated, and the braking strategy of the vehicle may be determined such that the calculated slope braking time is reflected in the calculated required braking instant.

According to the forward collision avoidance system and method of the vehicle of the present disclosure, there is an effect that the forward collision avoidance technique of the vehicle tuned for an even road is applicable to a sloped road.

In addition, accordingly, the reflecting of the gradient of the road in the forward collision avoidance control has an effect of enhancing the reliability of the forward collision avoidance control of the vehicle.

DETAILED DESCRIPTION

Specific structural or functional descriptions of the embodiments of the present disclosure disclosed in the present specification or application are presented by way of examples only for the purpose of describing the embodiments according to the present disclosure, and the embodiments according to the present disclosure may be implemented in various forms and should not be construed as being limited to the embodiments described in the present specification or application.

Since the embodiments according to the present disclosure may be modified in various ways and have various forms, specific embodiments will be illustrated in the drawings and described in detail in the present specification or application. However, this is not intended to limit the embodiments according to the concept of the present disclosure to a specific disclosure form and should be construed as including all modifications, equivalents, and substitutes included in the spirit and technical scope of the present disclosure.

Terms such as first and/or second may be used to describe various components, but the components should not be limited by the terms. The terms only serve the purpose of distinguishing one component from other components. For example, the first component may be referred to as the second component, and similarly, the second component may also be referred to as the first component without deviating from the scope of the right according to the concept of the present disclosure.

When a component is referred to as being "connected" or "coupled" to another component, it may be directly connected or coupled to the another component, but it should be understood that other components may exist in between. On the other hand, when a component is referred to as being "directly connected" or "directly coupled" to another component, it should be understood that there is no other component in between. Other expressions describing the relationship between components such as "between" and "just between" or "adjacent to" and "directly adjacent to" should be interpreted in the same manner.

The terms used in the present specification are only used to describe specific embodiments and are not intended to limit the present disclosure. Singular expressions include plural expressions unless the context explicitly indicates otherwise. In the present specification, terms such as "comprise" or "have" are intended to designate the presence of implemented features, numbers, steps, actions, components, parts, or combinations thereof and should not be understood to preclude the presence or additional possibilities of one or more of other features, numbers, steps, actions, components, parts or combinations thereof in advance.

Unless otherwise defined, all terms used herein, including technical or scientific terms, have the same meanings as are generally understood by those with common knowledge in the art to which the present disclosure belongs. The terms such as those defined in a generally used dictionary should be interpreted as having meanings consistent with the meanings in the context of the related technology and should not be interpreted as an idealistic or excessively formal meaning unless explicitly defined in the present specification.

Hereinafter, the present disclosure will be described in detail by describing preferred embodiments of the present disclosure with reference to the accompanying drawings. The same reference numerals shown in each drawing indicate the same members.

Figure 1:
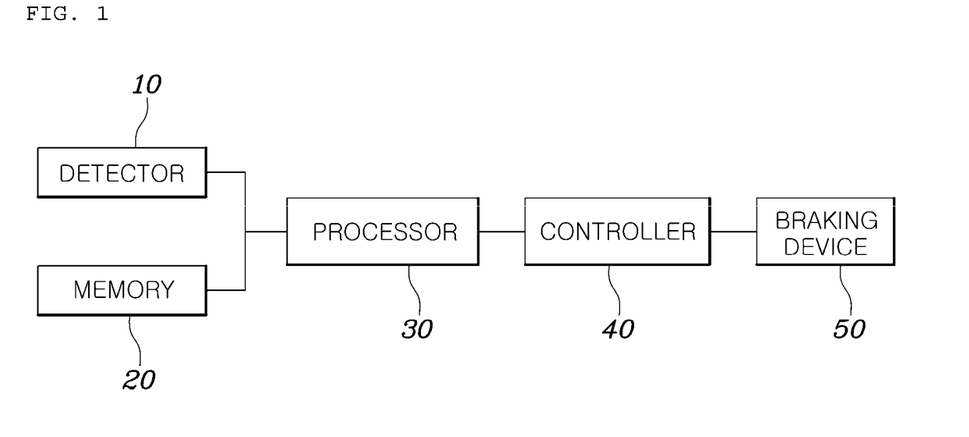
FIG. 1 is a block diagram of a forward collision avoidance system according to an embodiment of the present disclosure.

FIG. 1 is a block diagram showing a forward collision avoidance system of a vehicle according to an embodiment of the present disclosure.

FIG. 1 shows that the forward collision avoidance system of the vehicle according to an embodiment of the present disclosure includes a processor 30 estimating a gradient of a road the vehicle is traveling; a detector 10 detecting an obstacle positioned ahead in the traveling direction of the vehicle; a processor 30 determining a braking strategy of the vehicle based on the gradient estimated by the processor 30, a position of the obstacle detected by the detector 10, and a velocity of the vehicle; and a controller 40 controlling braking of the vehicle based on the braking strategy of the vehicle determined by the processor 30.

The processor 30, the detector 10, the processor 30, and the controller 40 according to an embodiment of the present disclosure may be implemented through a processor configured to perform operations to be described below using a nonvolatile memory 20 and data stored in the memory 20, the nonvolatile memory 20 being configured to store an algorithm configured to control operations of various components of the vehicle or data on software instructions reproducing the algorithm. Here, the memory 20 and the processor may be implemented as individual chips. Alternatively, the memory 20 and the processor may be implemented as a single integrated chip.

The processor 30 may estimate the gradient of the road the vehicle is traveling in a state where the vehicle wheels are in contact with the ground. Specifically, the slope of the vehicle may be sensed using a sensor mounted in the vehicle, or the gradient of the road may be estimated based on the road information received through a communication device mounted in the vehicle or stored in a storage device.

The detector 10 may detect the position, the velocity, or the type of obstacle.

The detector 10 may detect obstacles such as vehicles, structures, and pedestrians positioned ahead in the traveling direction of the vehicle. Specifically, when the vehicle is traveling forward, obstacles positioned in front of the vehicle may be detected, and when the vehicle is traveling backward, obstacles positioned in the rear of the vehicle may be detected.

More specifically, the detector 10 may be positioned at the front in the traveling direction of the vehicle and may detect obstacles that may collide with the vehicle if the vehicle keeps traveling. When the vehicle is traveling a road, obstacles positioned in a lane the vehicle is traveling may be detected.

The processor 30 may warn a driver of a danger of forward collision when a danger of collision arises such as a sudden stop of an obstacle detected in the front or a sudden detection of an obstacle.

In addition, the processor 30 may determine the braking strategy for controlling the braking of the vehicle when the danger of a forward collision is detected.

Specifically, the processor 30 may determine the braking strategy based on the position of the obstacle and velocity of the vehicle taking the time to collision with the obstacle into consideration, but may further reflect the gradient estimated by the processor 30 to determine the braking strategy.

A friction coefficient calculation unit 120 may calculate (or estimate) a friction coefficient ($\mu$Mg) of a road surface. For example, the friction coefficient calculation unit 120 may calculate (or estimate) a friction coefficient of a road surface using a wheel speed sensor value of the vehicle and an engine torque value provided by an engine controller (ECU). However, since various methods of calculating or estimating the friction coefficient of the road surface are known in various ways, the coefficient may be calculated (or estimated) using them. Therefore, a specific description thereof will be omitted.

In addition, based on a target control amount (braking control amount) at a general friction coefficient (for example the reference friction coefficient), the processor 30 determines the braking strategy of further reducing the target control amount as the road surface friction coefficient gets smaller than the general friction coefficient (general $\mu$>Low $\mu1$>Low $\mu2$).

In addition, to take an example of compensating the target braking instant of the forward collision avoidance command for the road surface friction coefficient, the processor 30 determines the braking strategy of further reducing the target braking instant (that is, the braking instant gets earlier) as the road surface friction coefficient gets smaller than the general friction coefficient (general $\mu$>Low $\mu1$>Low $\mu2$), based on the target braking instant at the general friction coefficient (for example, the reference friction coefficient).

A vehicle weight detector 130 detects (or measures) the weight of the vehicle (for example, the total weight of occupants and objects loaded in the vehicle) using a sensor (for example, a weight sensor) mounted in the vehicle.

To take an example of compensating the target braking amount of the forward collision avoidance command for the vehicle weight, the processor 30 determines the braking strategy of further increasing the target control amount as the vehicle weight increases (general weight<weight 1<weight 2), based on the target control amount (braking control amount) at the general weight (for example, the reference weight).

In addition, to take an example of compensating the target braking instant of the forward collision avoidance command for the vehicle weight, the processor 30 determines the braking strategy of further reducing the target braking instant (that is, the braking instant gets earlier) as the vehicle weight gets heavier than the general weight (general weight<weight 1<weight 2), based on the target braking instant at the general weight.

Accordingly, there are effects of minimizing the deviation of the target stopping distance caused by the vehicle weight and alleviating the driver's discomfort.

The controller 40 may control the braking of the vehicle according to the braking strategy of the processor 30. In particular, the controller 40 may be connected to braking device 50 braking the vehicle and control the braking device 50. The braking device 50 may be a brake braking wheels or an engine of the vehicle.

The detector 10 may be a detection sensor detecting a relative position and a relative velocity of the obstacle with respect to the vehicle.

In an embodiment, the detection sensor may be a camera sensor, a lidar sensor, a radar sensor, or an ultrasonic sensor. The detection sensor mounted in the vehicle may detect the relative position of the obstacle with respect to the vehicle.

In addition, the detection sensor may detect the velocity of the obstacle or detect the relative velocity of the obstacle with respect to the velocity of the vehicle.

In an embodiment, the processor 30 may estimate the gradient of the road by sensing the rotation angle at which the vehicle rotates in the pitch direction.

The processor 30 may be connected to a posture sensor, a pitch sensor, or an acceleration rate sensor (G sensor) sensing the rotation angle in the pitch direction of the vehicle and estimate the gradient of the road the vehicle is traveling.

In another embodiment, the processor 30 may estimate the gradient of the road based on the navigation information or the sensed atmospheric pressure change.

The processor 30 may estimate the gradient of the road the vehicle is traveling using the navigation information input through a communication device or previously stored.

Alternatively, the processor 30 may be connected to an atmospheric pressure sensor mounted in the vehicle and estimate the gradient of the road based on the atmospheric pressure change sensed by the atmospheric pressure sensor and the velocity of the vehicle. More specifically, the gradient of the road may be estimated using a gravity direction velocity of moving in the gravity direction according to the sensed atmospheric pressure change and the velocity of the vehicle.

In still another embodiment, the gradient of the road may be estimated using acceleration or deceleration traveling data of the vehicle.

Specifically, the gradient of the road may be estimated using acceleration or deceleration data including the driving force generated by a driving device or the braking force generated by the braking device 50 of the vehicle and the acceleration amount or deceleration amount of the vehicle.

For example, a formula for estimating the gradient of the road using an accelerator pedal depression amount (APS opening: Accelerator Position Sensor Opening), a brake depression amount, and the acceleration rate of the vehicle may be previously stored and the processor 30 may estimate the gradient of the road applying the acceleration or deceleration data to the previously stored formula.

In still another embodiment, the gradient of the road ahead of the vehicle may be estimated through a forward view image of the vehicle photographed by a camera using a camera sensor mounted to photograph the forward view of the vehicle.

The processor 30 may reflect the actual acceleration rate detected through a wheel speed sensor in the acceleration rate information detected through the acceleration rate sensor and estimate the gradient.

Figure 2:
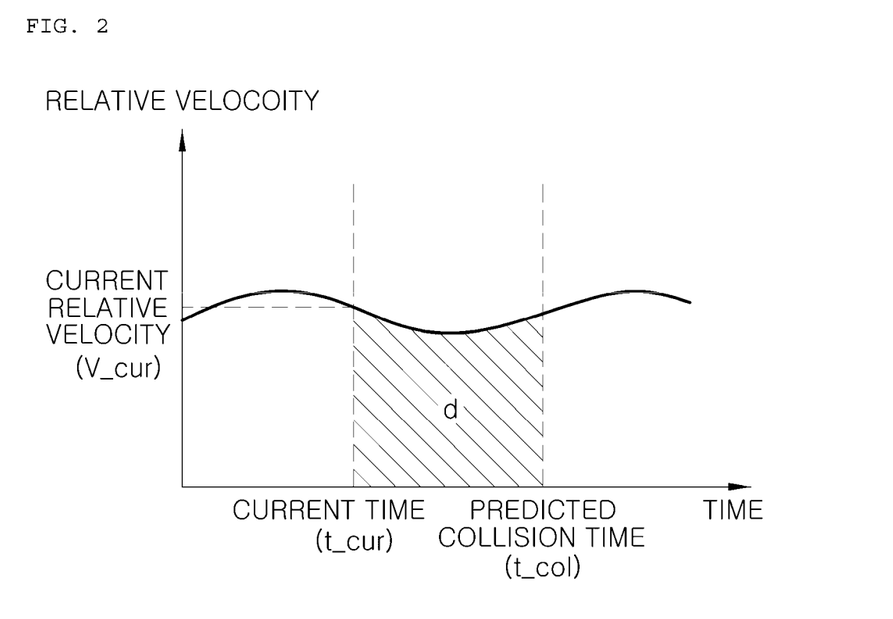
FIG. 2 is a graph showing a relative velocity between a vehicle and an obstacle over time according to an embodiment of the present disclosure.
Figure 3:
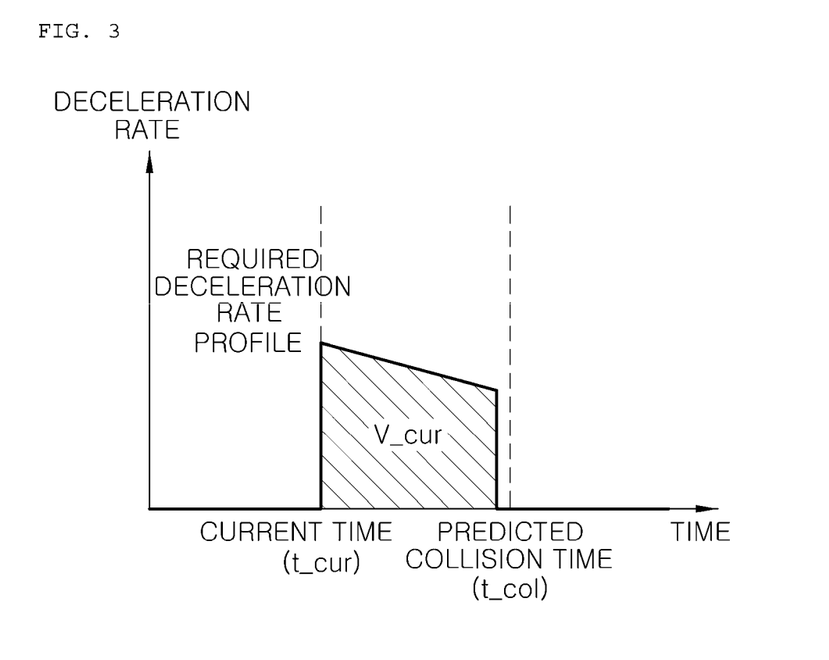
FIG. 3 is a graph showing an acceleration rate of a vehicle over time according to an embodiment of the present disclosure.
Figure 4:
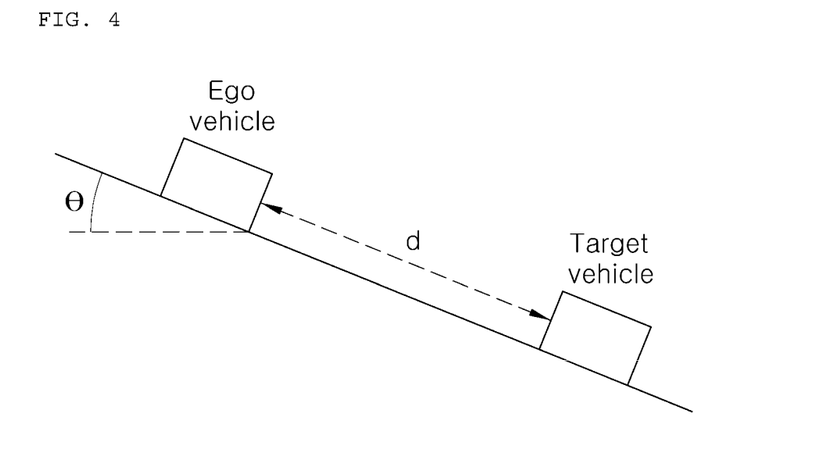
FIG. 4 shows a vehicle and an obstacle on a sloped road according to an embodiment of the present disclosure.

FIG. 2 is a graph showing a relative velocity between a vehicle and an obstacle over time according to an embodiment of the present disclosure. FIG. 3 is a graph showing an acceleration rate of a vehicle over time according to an embodiment of the present disclosure. FIG. 4 shows a vehicle and an obstacle on a sloped road according to an embodiment of the present disclosure.

FIGS. 2 to 4 show that the processor 30 may calculate the time to collision with the obstacle using the position of the obstacle detected by the detector 10 and the velocity of the vehicle and determine the braking strategy of the vehicle based on the calculated time to collision and the gradient estimated by the processor 30.

More specifically, the processor 30 may calculate a required deceleration rate based on the calculated time to collision, calculate a slope deceleration rate in accordance with the estimated gradient, and determine the braking strategy of the vehicle such that the calculated slope deceleration rate is reflected in the calculated required deceleration rate.

As shown in FIG. 2, when the distance between the obstacle and the vehicle, obtained as a value by integrating the relative velocity between the obstacle and the vehicle over time, becomes zero, the obstacle and the vehicle collide with each other.

In an embodiment, the detector 10 may detect the distance between the obstacle and the vehicle and the relative velocity between the obstacle and the vehicle and use them to calculate the time to collision (TTC) as shown in the following formula:

$$TTC = t\_col - t\_cur = d/V\_cur [sec],$$

where d is the distance between the obstacle and the vehicle and V_cur is the relative velocity between the obstacle and the vehicle in the current state.

In another embodiment, the detector 10 may predict the relative velocity until the collision using the current relative velocity between the obstacle and the vehicle and calculate the time TTC when the value obtained by integrating the predicted relative velocity over time from the current time until the collision becomes the distance d between the obstacle and the vehicle.

As shown in FIG. 3, in order to avoid the collision, the vehicle has to make the relative velocity with respect to the obstacle zero prior to the time to collision (TTC). The braking strategy may be determined such that the value obtained by integrating the deceleration rate of the vehicle over time prior to the time to collision TTC becomes the relative velocity between the obstacle and the vehicle.

In an embodiment, the required deceleration rate a_req may be calculated from a profile in which the value obtained by integration over time set equal to or less than the time to collision becomes the relative velocity between the obstacle and the vehicle.

The profile of the required deceleration rate a_req may be such that the deceleration rate is calculated to remain at a constant magnitude or the magnitude is calculated to decrease over time as shown in FIG. 3. Alternatively, the magnitude may be calculated to increase over time.

As shown in FIG. 4, when the vehicle and the obstacle are positioned on a sloped road, the processor 30 may calculate the slope deceleration rate a_θ in accordance with the estimated gradient θ by the following formula in an embodiment:

$$a\_\theta = g * \cos(\theta) \; [m/s^2]$$

The processor 30 may determine the braking strategy of the vehicle such that the calculated slope deceleration rate a_θ is reflected in the calculated required deceleration rate a_req. In an embodiment, the controller 40 may set the deceleration rate for controlling the braking of the vehicle by the following formula:

$$a\_ctr = a\_req + a\_\theta + \text{tolerance value},$$

where the tolerance value may be a value tuned for safety.

In another embodiment, the processor 30 may calculate the required braking instant based on the calculated time to collision, calculate the slope braking time in accordance with the estimated gradient, and determine the braking strategy of the vehicle such that the calculated slope braking time is reflected in the calculated required braking instant.

The processor 30 may determine the braking instant as a braking strategy of the vehicle. The braking instant may be determined to be the instant when the detector 10 detects a possibility of the collision with the obstacle or an instant thereafter.

Specifically, the required braking instant may be calculated based on the calculated time to collision (TTC) or the profile of the required deceleration rate a_req calculated based thereon.

More specifically, the required braking instant may be included in the profile of the required deceleration rate a_req, and the profile of the required deceleration rate a_req may be set such that the magnitude of the maximum deceleration rate is equal to or less than a predetermined value.

That is, according to an embodiment, the processor 30 may set the required braking instant such that the magnitude of the maximum deceleration rate in the profile of the required deceleration rate a_req is equal to or less than a predetermined value.

In addition, the processor 30 may calculate the slope braking time in accordance with the estimated gradient. The slope braking time may be predetermined for each estimated gradient θ in an embodiment or may be calculated by a formula using the estimated gradient θ in another embodiment.

In an embodiment, the slope braking time may be calculated as a positive value in the case of a downhill slope and as a negative value in the case of an uphill slope and may be calculated such that the magnitude of the slope braking time increases as the magnitude of the gradient increases.

Accordingly, the processor 30 may determine the braking strategy of the vehicle such that the slope braking time is reflected in the required braking instant. Specifically, the processor 30 may determine the braking strategy to advance the required braking instant by the slope braking time in the case of a downhill slope and may determine the braking strategy to delay the required braking instant by the slope braking time in the case of an uphill slope.

Figure 5:
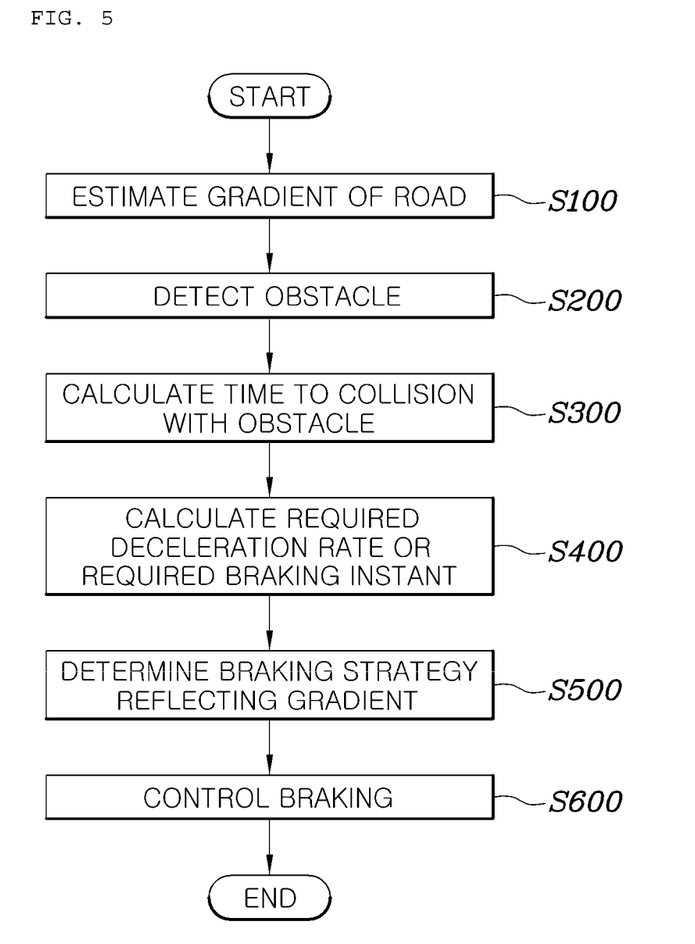
FIG. 5 is a flowchart of a forward collision avoidance method of a vehicle according to an embodiment of the present disclosure.

FIG. 5 is a flowchart of a forward collision avoidance method of a vehicle according to an embodiment of the present disclosure.

FIG. 5 further shows that the forward collision avoidance method of the vehicle includes a step S100 of estimating a gradient of a road the vehicle traveling; a step S200 of detecting an obstacle positioned ahead in the traveling direction of the vehicle; a step S500 of determining the braking strategy of the vehicle based on the estimated gradient, a detected position of the obstacle, and a velocity of the vehicle; and a step S600 of controlling the braking of the vehicle based on the determined braking strategy of the vehicle.

In the step S200 of detecting the obstacle, a relative position and a relative velocity of the obstacle with respect to the vehicle may be detected through a detection sensor.

In the step S100 of estimating the gradient of the road, the gradient of the road may be estimated by sensing a rotation angle at which the vehicle rotates in the pitch direction.

In the step S100 of estimating the gradient of the road, the gradient of the road may be estimated based on the navigation information or the sensed atmospheric pressure change.

In the step S100 of estimating the gradient of the road, the gradient of the road may be estimated using acceleration or deceleration traveling data of the vehicle.

In the step S500 of determining the braking strategy of the vehicle, the time to collision with the obstacle may be calculated (S300) using the detected position of the obstacle and the velocity of the vehicle, and the braking strategy of the vehicle may be determined (S500) based on the calculated time to collision and the gradient estimated by the processor 30.

In the step S500 of determining the braking strategy of the vehicle, a required deceleration rate may be calculated (S400) based on the calculated time to collision, the slope deceleration rate in accordance with the estimated gradient may be calculated, and the braking strategy of the vehicle may be determined (S500) such that the calculated slope deceleration rate is reflected in the calculated required deceleration rate.

In the step S500 of determining the braking strategy of the vehicle, a required braking instant may be calculated (S400) based on the calculated time to collision, a slope braking time in accordance with the estimated gradient may be calculated, and the braking strategy of the vehicle may be determined (S500) such that the calculated slope braking time is reflected in the calculated required braking instant.

Specific embodiments of the present disclosure are illustrated and described, but it will be self-evident to those with common knowledge in the related art that the present disclosure may be improved and modified in various ways within the scope not departing from the technical spirit of the present disclosure provided by the patent claims below.

What is claimed is:

1. A forward collision avoidance system of a vehicle, comprising:
    a detector configured to detect an obstacle positioned ahead in a traveling direction of the vehicle;
    a processor;
    a memory coupled to the processor and storing an algorithm that, when executed by the processor, causes the processor to:
        estimate a gradient of a road on which the vehicle is traveling, and
        determine a braking strategy of the vehicle based on the estimated gradient, a position of the detected obstacle, and a velocity of the vehicle; and
    a controller configured to control braking of the vehicle based on the braking strategy of the vehicle determined by the processor.

2. The forward collision avoidance system of the vehicle according to claim 1, wherein the detector is a detection sensor detecting a relative position and a relative velocity of the obstacle with respect to the vehicle.

3. The forward collision avoidance system of the vehicle according to claim 1, wherein the processor estimates the gradient of the road by sensing a rotation angle at which the vehicle rotates in a pitch direction.

4. The forward collision avoidance system of the vehicle according to claim 1, wherein the processor estimates the gradient of the road based on navigation information or a sensed atmospheric pressure change.

5. The forward collision avoidance system of the vehicle according to claim 1, wherein the processor estimates the gradient of the road using acceleration or deceleration traveling data of the vehicle.

6. The forward collision avoidance system of the vehicle according to claim 1, wherein the processor calculates a time to collision with the obstacle using the position of the obstacle detected by the detector and the velocity of the vehicle and determines the braking strategy of the vehicle based on the calculated time to collision and the gradient estimated by the processor.

7. The forward collision avoidance system of the vehicle according to claim 6, wherein the processor calculates a required deceleration rate based on the calculated time to collision, calculates a slope deceleration rate in accordance with the estimated gradient, and determines the braking strategy of the vehicle such that the calculated slope deceleration rate is reflected in the calculated required deceleration rate.

8. The forward collision avoidance system of the vehicle according to claim 6, wherein the processor calculates a required braking instant, calculates a slope braking time in accordance with the estimated gradient, and determines the braking strategy of the vehicle such that the calculated slope braking time is reflected in the calculated required braking instant.

9. A forward collision avoidance method of a vehicle, comprising steps of:
    estimating a gradient of a road on which the vehicle is traveling;
    detecting an obstacle positioned ahead in a traveling direction of the vehicle;
    determining a braking strategy of the vehicle based on the estimated gradient, a detected position of the obstacle, and a velocity of the vehicle; and
    controlling braking of the vehicle based on the determined braking strategy of the vehicle.

10. The forward collision avoidance method of the vehicle according to claim 9, wherein, in the step of detecting the obstacle, a relative position and a relative velocity of the obstacle with respect to the vehicle are detected through a detection sensor.

11. The forward collision avoidance method of the vehicle according to claim 9, wherein, in the step of estimating the gradient of the road, the gradient of the road is estimated by sensing a rotation angle at which the vehicle rotates in a pitch direction.

12. The forward collision avoidance method of the vehicle according to claim 9, wherein, in the step of estimating the gradient of the road, the gradient of the road is estimated based on navigation information or a sensed atmospheric pressure change.

13. The forward collision avoidance method of the vehicle according to claim 9, wherein, in the step of estimating the gradient of the road, the gradient of the road is estimated using acceleration or deceleration traveling data of the vehicle.

14. The forward collision avoidance method of the vehicle according to claim 9, wherein, in the step of determining the braking strategy of the vehicle, a time to collision with the obstacle is calculated using the detected position of the obstacle and a velocity of the vehicle and the braking strategy of the vehicle is determined based on the calculated time to collision and the estimated gradient.

15. The forward collision avoidance method of the vehicle according to claim 14, wherein, in the step of determining the braking strategy of the vehicle, a required deceleration rate is calculated based on the calculated time to collision, a slope deceleration rate in accordance with the estimated gradient is calculated, and the braking strategy of the vehicle is determined such that the calculated slope deceleration rate is reflected in the calculated required deceleration rate.

16. The forward collision avoidance method of the vehicle according to claim 14, wherein, in the step of determining the braking strategy of the vehicle, a required braking instant is calculated based on the calculated time to collision, a slope braking time in accordance with the estimated gradient is calculated, and the braking strategy of the vehicle is determined such that the calculated slope braking time is reflected in the calculated required braking instant.

* * * * *